No. 614,214. Patented Nov. 15, 1898.
C. T. NELSON.
AUTOMATIC MACHINE FOR MAKING SCREWS OR OTHER ARTICLES.
(Application filed Apr. 29, 1898.)
(No Model.) 3 Sheets—Sheet 1.
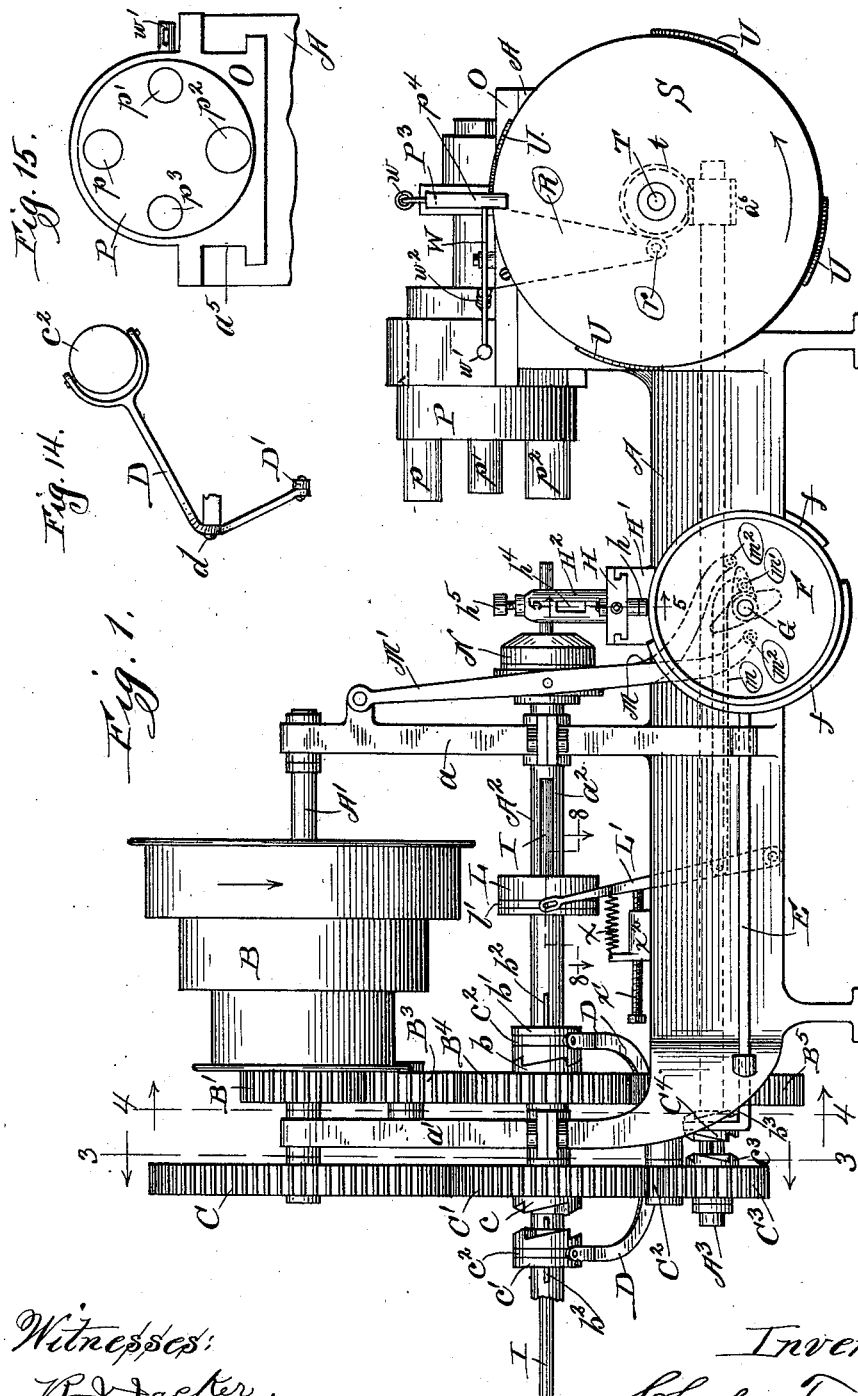

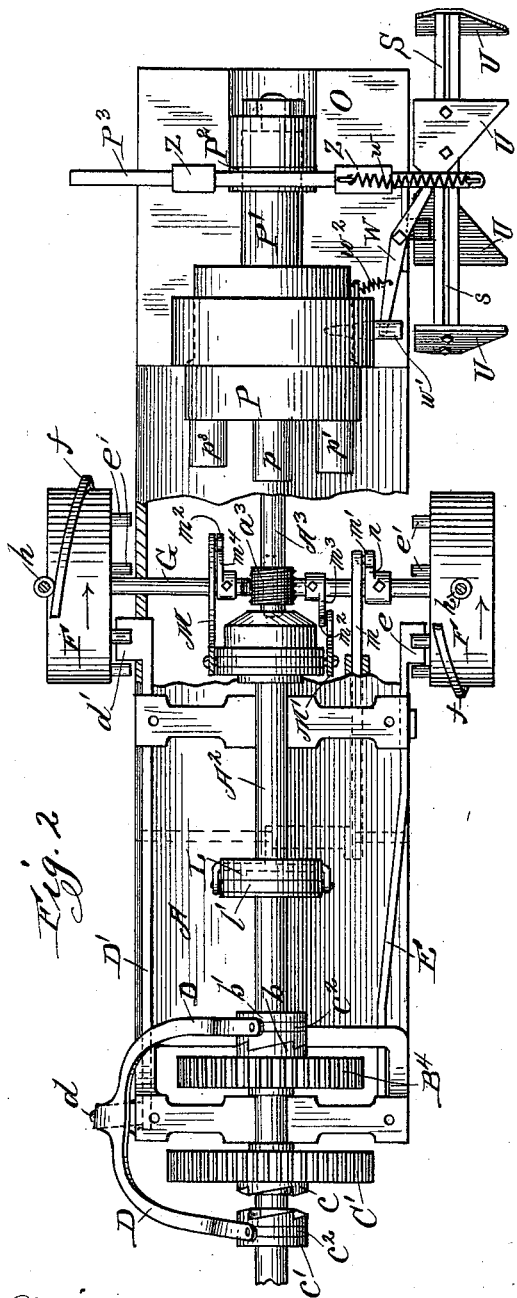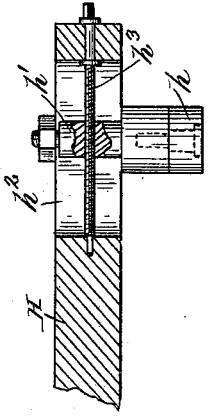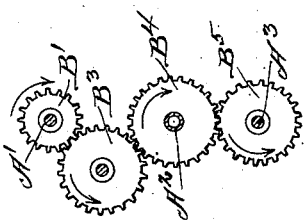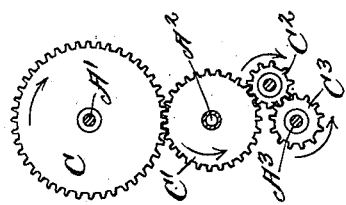

No. 614,214. Patented Nov. 15, 1898.
C. T. NELSON.
AUTOMATIC MACHINE FOR MAKING SCREWS OR OTHER ARTICLES.
(Application filed Apr. 29, 1898.)

(No Model.) 3 Sheets—Sheet 3.

Witnesses:
R. J. Jacker.
E. A. Duggan.

Inventor:
Charles T. Nelson.
By Chas. C. Tillman Atty.

UNITED STATES PATENT OFFICE.

CHARLES T. NELSON, OF CHICAGO, ILLINOIS, ASSIGNOR OF ONE-THIRD TO HANS O. HAMMER, OF SAME PLACE.

AUTOMATIC MACHINE FOR MAKING SCREWS OR OTHER ARTICLES.

SPECIFICATION forming part of Letters Patent No. 614,214, dated November 15, 1898.

Application filed April 29, 1898. Serial No. 679,183. (No model.)

*To all whom it may concern:*

Be it known that I, CHARLES T. NELSON, a citizen of the United States, residing at Chicago, in the county of Cook and State of Illinois, have invented certain new and useful Improvements in Automatic Machines for Making Screws or other Articles, of which the following is a specification.

This invention relates to automatic machinery for shaping or making various articles, such as screws, bolts, nuts, rivets, burs, washers, spikes, and kindred or analogous articles; and it consists in certain peculiarities of the construction, novel arrangement, and operation of the various parts thereof, as will be hereinafter more fully set forth and specifically claimed.

One of the principal objects of the invention is to provide an improved reversing work or feed carrier, by which the article being formed may be rotated in either direction and its movement to the shaping-tool regulated.

Another object is to furnish means for holding the tools and for advancing and withdrawing them.

Other objects of the invention have reference to simplicity and effectiveness in the various parts and to a general improvement in the details of the machine.

In order to enable others skilled in the art to which my invention pertains to make and use the same, I will now proceed to describe it, referring to the accompanying drawings, in which—

Figure 6:
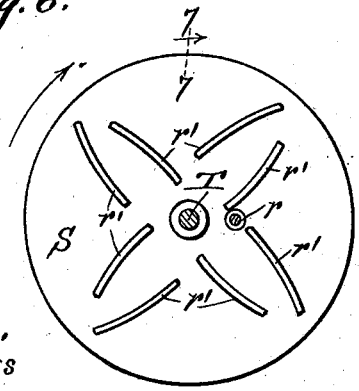
Figure 7:
Figure 9:
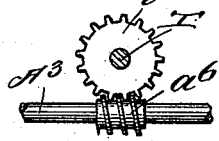
Figure 10:
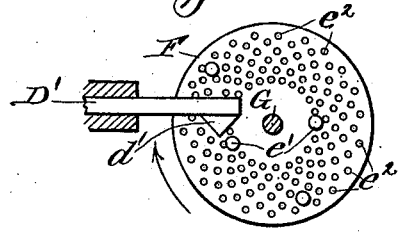
Figure 8:
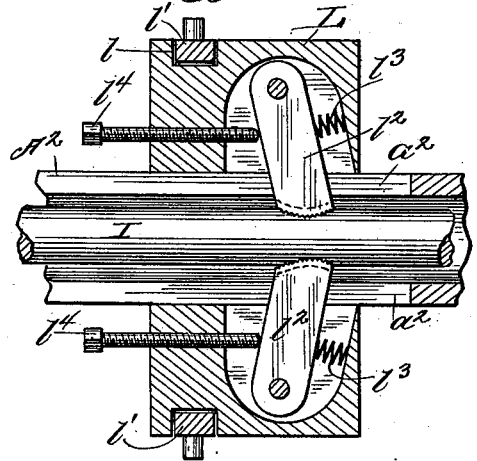
Figure 11:
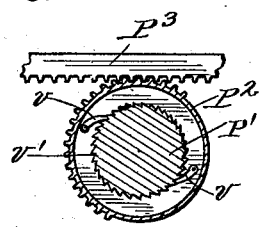
Figure 12:
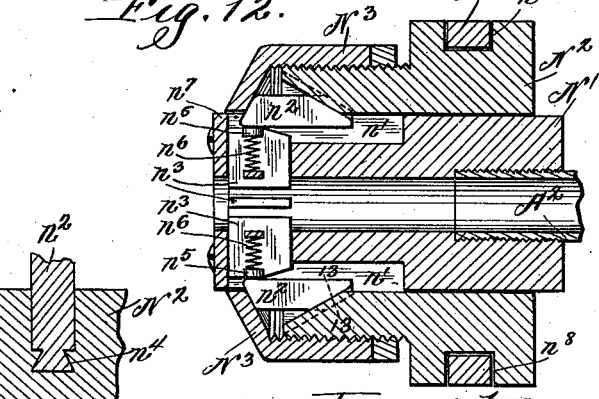
Figure 13:
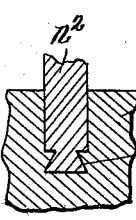

Figure 1 is a view in side elevation of the machine, showing the parts in position ready for operation. Fig. 2 is a plan view, partly in section, with the power-pulley and upper driving-gears moved. Fig. 3 is a view in elevation, partly in section, taken on line 3 3 of Fig. 1, looking in the direction indicated by the arrows and showing one set of the driving-gears. Fig. 4 is a similar view, taken on line 4 4 of Fig. 1, showing the other set of driving-gears. Fig. 5 is a sectional view, partly in elevation, taken on line 5 5 of Fig. 1, showing a portion of the sliding plate which carries a tool-post. Fig. 6 is a face view of the inner surface of a cam-bearing disk which operates the tool-head. Fig. 7 is a sectional view of the outer portion of said disk. Fig. 8 is a sectional view of the feed-clutch, showing it mounted on the hollow shaft and engaging a rod or the feed-piece. Fig. 9 is a detail view of the driving-shaft for the tool-head, showing gears thereon. Fig. 10 is an inner face view of one of the disks or wheels used for operating the feed-chuck and feed-clutch. Fig. 11 is a view, partly in section and partly in elevation, of a rack-bar and ratchet employed for turning the tool-head. Fig. 12 is a central sectional view of the feed-chuck, showing it in its advanced position and with its jaws depressed. Fig. 13 is a sectional detail view of a portion thereof, taken on line 13 13 of Fig. 12. Fig. 14 is a view in elevation of the lever for operating the reversing-clutches, and Fig. 15 is an end view of the tool-head and its carrying-block.

Similar letters refer to like parts throughout the different views of the drawings.

A represents the main or supporting frame of the machine, which is provided with uprights or standards $a$ and $a'$, in which the shafts A' and A$^2$ are journaled. Mounted on the shaft A' is a cone-pulley B for the reception and operation of a power-supplying belt. The shaft A$^2$ is hollow and is journaled some distance below the shaft A', as shown in Fig. 1 of the drawings, and is provided with a longitudinal slot $a^2$ for the operation of the clamping-jaws of the feed-clutch. Mounted on the shaft A' are gears B' and C, the former of which meshes with a gear B$^3$, journaled on the standard $a'$, which in its turn meshes with a gear B$^4$, mounted on the hollow shaft A$^2$, and which gear meshes with a gear B$^5$ on the driving-shaft A$^3$, which extends longitudinally of the supporting-frame and has its bearings in the lower part thereof. The gear C meshes with a gear C', mounted on the hollow shaft A$^2$, which gear engages another gear C$^2$, which meshes with a gear C$^3$ on the driving-shaft. The gears B$^4$ and C' are provided, respectively, on their opposite surfaces with a ratchet-faced disk $b$ and $c$ to engage clutches $b'$ and $c'$, which have their faces adjacent to the said disks formed with ratchets to engage those of the disks, and are movably secured on the hollow shaft A$^2$ by means of keys $b^2$.

Each of the clutches $b'$ and $c'$ has loosely surrounding it a band $c^2$, to which are secured the ends of a forked lever D, which is fulcrumed, as at $d$, on the main frame and has pivotally secured to its lower end a bar or rod D', which extends longitudinally with the main frame and has on its forward end a lateral and beveled projection $d'$, the function of which will presently be explained.

The gears $B^5$ and $C^3$ are provided, respectively, on their adjacent surfaces with a ratchet-faced disk $b^3$ and $c^3$ to alternately engage the clutch $C^4$, which has each of its surfaces formed with ratchets to engage those of the last-named disks and is movably mounted on the driving-shaft. Secured to the clutch $C^4$, at one of its ends, is a sliding bar or rod E, which extends longitudinally with the main frame and has at its other end a lateral and beveled projection $e$ to engage the pins $e'$ on one of the wheels F, mounted on the shaft G, which is transversely journaled on the main frame and is provided at its middle with a gear to engage the worm-gear $a^3$ on the driving-shaft. The projection $d'$ on the sliding bar D' engages pins $e'$ on the wheel F, located on the opposite side of the frame from the sliding bar E, which operates the clutch $C^4$ on the driving-shaft.

The wheels F are provided with a number of openings $e^2$ to receive the pins $e'$ and furnish a means of adjusting the movements of the sliding bars D' and E, which operate the clutches, for it is apparent by reference to Fig. 10 of the drawings that as the wheel is rotated one of the pins $e'$ will contact with one of the inclined surfaces of the projections $e$ or $d'$ and will thus force the bar back and forth, causing the clutch or clutches which it controls to engage one or the other of the ratchet-faced disks on the gears bearing them, as above set forth. Each of the wheels F is provided on its periphery with a cam-rib $f$ to engage rollers $h$ on the ends of the sliding plate H, which is movably mounted on a bed-block H' on the main frame. The shafts $h'$ of the rollers $h$ pass through slots $h^2$ in the plate H and may be adjusted therein by means of screws $h^3$, which engage the shafts of the rollers and are used for said purpose. Mounted on the plate H is a post $H^2$, provided with an opening $h^4$ for the reception of a suitable tool to be used for severing or shaping the stock or rod I, out of which the screws and other articles are made or shaped. The post $H^2$ is provided with a set-screw $h^5$ in its upper part to be used for securing the tool in position. Movably mounted on the hollow shaft $A^2$ is a feed-clutch L, around which is located in a suitable mortise or groove $l$ a band $l'$, to which is pivotally secured a lever L', fulcrumed at its lower end to the main or supporting frame. Within the cavity or cavities of the clutch L are pivoted jaws $l^2$, whose free ends are serrated to engage the stock-rod I, as is clearly shown in Fig. 8 of the drawings. The jaws $l^2$ extend through the slots $a^2$ in the hollow shaft and are normally held in contact with the stock-rod by means of springs $l^3$ and are regulated in their movements by means of screws $l^4$, located in the clutch. Connected to the lever L', near its lower end, is a rod or bar $m$, whose forward end is provided with a roller $m'$ to engage a cam $n$, mounted on the shaft G, which cam will impinge said roller in its revolution and cause the rod $m$ to be reciprocated, and through it and the lever L' the feed-clutch L, in the forward movement of which the jaws $l^2$ will clamp the feed I and force it forward through the hollow shaft. As the clutch L is drawn back it is evident that the jaws will be disengaged from the stock-rod. On the front end of the hollow shaft $A^2$ is located a chuck N, which comprises a tubular piece N', which is screwed onto the hollow shaft $A^2$ or otherwise secured thereto and is provided in its front portion with recesses $n'$ for the operation of the sliding blocks $n^2$, which rest on the outer ends of the jaws $n^3$, which pass through suitable slots in the front end of the tubular piece N', which is surrounded by a collar $N^2$, whose front portion is externally screw-threaded to engage a cap $N^3$, fitting over the blocks $n^2$ and jaws $n^3$ and having its front end inwardly inclined, as shown in Fig. 12 of the drawings. The front end of the collar $N^2$ is inwardly beveled and provided with dovetail grooves $n^4$ to receive correspondingly-shaped portions of the blocks $n^2$, whose forward ends rest on the outer ends of the jaws $n^3$ and will depress the same when the collar $N^2$ is moved forward. Each of the jaws $n^3$ has its outer end rearwardly inclined and is provided with an arm $n^5$, against which rests one end of a spring $n^6$, whose other end rests on a portion of the tubular piece N', secured on the hollow shaft. The jaws $n^3$ are held in position by means of a plate $n^7$, secured to the tubular piece by means of screws or otherwise. Around the collar $N^2$ is loosely secured in an annular groove $n^8$ a band $N^4$, to which is fulcrumed levers M and M', whose upper ends are pivotally secured to the upright $a$ or a bracket thereon. The lower ends of the levers M and M' are each provided with rollers $m^2$, which impinge upon cams $m^3$ and $m^4$, fixed on the shaft G, which, as before stated, is driven by means of the main or driving shaft. On the front of the main frame, in a suitable bed piece or block O, is journaled the tool-head P, which is provided with a number of tools $p$, $p'$, $p^2$, and $p^3$ of the desired kind. The block O, which carries the tool-head, slides in a suitable guideway $a^5$ in the main frame and has on one of its sides a downwardly-extending arm R, which is provided at its lower end with a roller $r$ to impinge upon the cam-ribs $r'$ on the wheel S, which is mounted on a shaft T, journaled on the main wheel, and which shaft is provided with a gear $t$ to engage a worm-gear $a^6$ on the main or driving shaft. The wheel S is provided in its periphery with a circumferential groove $s$ (see Fig. 7) to receive the heads of screws used for securing in position the wing-cams U, which project on each side of the wheel and have their front edges on both sides of the wheel inclined, as shown in Fig. 2 of the drawings. The tool-head P is mounted on a shaft P′, journaled in suitable bearings on the upper surface of the block O or sliding bed-piece, and said shaft is surrounded by a collar $P^2$, provided with gear-teeth on its outer surface to engage a rack-bar $P^3$, transversely supported by means of brackets $z$ on the bed-block. Pivotally secured to the collar $P^2$ are pawls $v$, which engage ratchet-teeth $v'$ on the shaft of the tool-head. Secured to one end of the rack-bar $P^3$ is a spring $w$, whose other end is secured to one of the brackets $z$, said spring being employed to retract the rack-bar, in which operation the pawls will be disengaged from the ratchet on the shaft of the tool-head.

The end of the rack-bar $P^3$ adjacent to the outer surface of the wheel S is provided with a downwardly-extending arm $p^4$, which impinges upon the outer inclined edges of the wing-cams U and will cause the rack-bar to move across the bed-piece and rotate the tool-head one-quarter of a revolution, thus placing one of the tools on the head in alinement with the hollow shaft, through which the work or stock rod extends.

The tool-head is firmly held in such position by means of a pin $w'$, extending into openings formed at the proper points in said head, which pin is withdrawn therefrom by means of the lever W, fulcrumed on the bed-block and having one of its ends bent outwardly, as shown in Fig. 2, to impinge upon the inclined portions of the wing-cams U, adjacent to the bed-block, and said pin is held in position by means of a spring $w^2$, connected at one of its ends to the lever W and at its other end to a support on the bed-block.

The operation of my machine is as follows: The rod or bar I, of which the screws or other articles are made, is placed in the hollow shaft $A^2$ and has its front end extending some distance therethrough, as shown in Fig. 1 of the drawings, in which position it will be firmly held by means of the chuck N, mounted on the front end of the hollow shaft. The tool-head P is turned so that the desired tool thereon may be brought into alinement with the forward end of the stock I or work. By applying power to the cone-pulley the driving-shaft $A^3$ will be rotated in one direction by one set of gears and the shafts G and T, bearing the wheels F and S, respectively, will be rotated through their gearings with the driving-shaft, the pins $e'$ acting on the projections $e$ and $d'$ on the sliding bars E and D′, respectively, which will force the clutches on the hollow shaft and driving-shaft out of engagement with one set of gears and into engagement with the other set, thus reversing the movement of the machine. At the proper time the levers M and M′ and the rod or bar $m$, by engagement with the cams $m^4$, $m^3$, and $n$, will operate the chuck and feed-clutch so as to release the chuck from the stock or work rod and allow it to be pushed forward by means of the feed-clutch. The movement of the levers M and M′, secured to the band $N^4$ on the collar $N^2$, will cause said collar to slide on the tubular piece N′ and carry with it the blocks $n^2$, which may be adjusted by means of the cap $N^3$, used for this purpose. As the said collar is being retracted, so as to place the front ends of the blocks $n^2$ over the inclined portions of the jaws $n^3$, the latter will be forced outwardly by means of the springs $n^6$, which actuate them. In the revolution of the wheel S the roller $r$ on the arm R will impinge upon the rib-cams $r'$, which will cause the bed-block O, carrying the tool-head P, to be advanced and retracted. The wing-cams U on the wheel S, contacting at their beveled outer edges with the arm $p^4$ on the rack-bar $P^3$, will cause said bar to move across the bed-block and through its engagement with the gear on the shaft P′ of the tool-head rotate the said head one-quarter of a revolution, the pin $w'$ being withdrawn from the tool-head through the medium of the lever W contacting with the beveled inner edges of the wing-cams. As soon as the tool-head is turned to the proper point the spring $w^2$ will retract the lever W and force the pin $w'$ into the opening of the tool-head and securely hold it in position. The lever L′, which operates the feed-clutch L, is retracted by means of a spring $x$, and the throw of said lever is regulated by a set-screw $x'$, passing through a suitable bracket $x^2$ on the main frame and to which the spring $x$ is secured. The sliding block or plate H, which carries the tool-post $H^2$, which, as before stated, may be provided with a knife or implement to sever or shape the stock-rod, is moved back and forth through the instrumentality of the cams $f$ on the wheels F, which cams impinge upon the rollers $h$ on the sliding plate or block.

The above operation is repeated at frequent intervals, and it is apparent that the tools $p$ to $p^3$, inclusive, may be of any suitable kind to give the proper form to the article being made or shaped.

Having thus fully described my invention, what I claim as new, and desire to secure by Letters Patent, is—

1. The combination with a main or supporting frame, of a hollow shaft and a driving-shaft journaled thereon, means to drive and reverse said shafts, a bed-block movably mounted on the main frame, a tool-carrying head rotatably mounted on said block, a downwardly-extending arm secured to the bed-block and having at its free end a roller, a shaft journaled on the main frame under the bed-block and geared to the driving-shaft, a wheel mounted on said shaft and having on its inner surface a series of cam-ribs and on its periphery a series of wing-cams, a spring-actuated rack-bar transversely supported on the bed-block, a collar surrounding the shaft of the tool-head and provided with gear-teeth to engage said rack-bar, ratchet-teeth on the shaft of the tool-head, pawls to engage said ratchet-teeth, a downwardly-extending arm located on one end of the rack-bar to engage the wing-cams, substantially as described.

2. A chuck comprising a tubular piece, having recesses in its forward portion, a collar surrounding said tubular piece and having its front portion inwardly beveled and provided with grooves, blocks located in said grooves and in the recesses of the tubular piece, spring-actuated jaws movably located in the front part of the tubular piece and contacting at one of their ends with the said blocks, and a cap secured to the front portion of the collar, substantially as described.

CHARLES T. NELSON.

Witnesses:
    CHAS. C. TILLMAN,
    E. A. DUGGAN.